United States Patent [19]

Van Nielen

[11] Patent Number: 5,416,775

[45] Date of Patent: May 16, 1995

[54] METHOD FOR IMPROVING THE TRANSMISSION OF INFORMATION IN THE FORM OF DATA PACKETS, IN ACCORDANCE WITH A DISTRIBUTED QUEUING PROTOCOL

[75] Inventor: Marcus J. J. Van Nielen, Leidschendam, Netherlands

[73] Assignee: Koninklijke PTT Nederland NV, AC Groningen, Netherlands

[21] Appl. No.: 941,075

[22] PCT Filed: May 14, 1991

[86] PCT No.: PCT/EP91/00907

§ 371 Date: Oct. 15, 1992

§ 102(e) Date: Oct. 15, 1992

[87] PCT Pub. No.: WO91/18461

PCT Pub. Date: Nov. 28, 1991

[30] Foreign Application Priority Data

May 21, 1990 [NL] Netherlands .................. 9001173

[51] Int. Cl.$^6$ .................................................. H04J 3/02
[52] U.S. Cl. .................................................. 370/85.11
[58] Field of Search ............... 370/94.1, 85.1, 85.2, 370/85.6, 85.7, 85.9, 85.11, 84, 95.3, 85.5; 340/825.5, 825.51, 825.07

[56] References Cited

U.S. PATENT DOCUMENTS

| | | | |
|---|---|---|---|
| 4,977,557 | 12/1990 | Phung et al. | 370/85.6 |
| 5,001,707 | 3/1991 | Kositpouboon et al. | 370/94.1 |
| 5,038,347 | 8/1991 | Courtois | 370/85.6 |
| 5,081,622 | 1/1992 | Nassehi et al. | 370/94.1 |
| 5,111,456 | 5/1992 | Limb | 370/85.1 |
| 5,115,430 | 5/1992 | Hahne et al. | 370/85.11 |
| 5,124,981 | 6/1992 | Golding | 370/85.9 |
| 5,157,657 | 10/1992 | Potter et al. | 370/85.6 |

OTHER PUBLICATIONS

R. M. Newman et al., "The QPSX Man", Apr. 1988, pp. 20–28, IEEE Communications Magazine, vol. 26, No. 4.
H. Ohnishi et al., "ATM Ring Protocol and Performance", Jun. 1989, pp. 394–398, IEEE International Conference on Communications, Boston, Mass.

*Primary Examiner*—Benedict V. Safourek
*Assistant Examiner*—Chau T. Nguyen
*Attorney, Agent, or Firm*—Frishauf, Holtz, Goodman & Woodward

[57] ABSTRACT

A data packet transmission system having a succession of stations each connected to two buses transmitting in opposite directions, both packets and time-slot requests has its capacity improved by means of a request-erase counter at each station for each bus, making possible more efficient use of time slots. Except for the different combinations of status and expectable occurrence, the queuing protocol known as DQDB, optionally is modified by D$^3$Q protocol, is used. For those ten situations where time-slot-request bit resetting (erasing) comes into play, status is defined by the state of certain counters while expectable occurrences are arrivals at a station's access unit of a time-slot that is empty or contains a data packet or a request bit and also the use, if any, made of the arriving time slot by the access unit of the station. The actions produced in those ten instances are in terms of setting or resetting a request bit and advancing, reducing or resetting contents of one or more counters.

16 Claims, 2 Drawing Sheets

METHOD FOR IMPROVING THE TRANSMISSION OF INFORMATION IN THE FORM OF DATA PACKETS, IN ACCORDANCE WITH A DISTRIBUTED QUEUING PROTOCOL

The invention relates to a method for transmitting information in the form of data packets in a communications network which comprises two unidirectional transmission channels of opposing transmission direction and stations or access units each of which is linked to both of those two transmission channels. Information moves, under the control of clock signals, respectively from the first to the last access unit over a first transmission channel and from the last to the first access unit over a second transmission channel. Successive time slots are generated which always comprise the same predetermined number of clock signal cycles. In each of these time slots a number of information bits can be written. An access unit which is ready to transmit a data packet places a request bit in a time slot in the transmission channel other than the channel in which the data packet needs to be transmitted to reach its destination. Each access unit records the number of request bits which have passed through and beyond it and the number of request bits still to be transmitted by that access unit.

BACKGROUND AND PRIOR ART

A method of this type is described in European Patent Application EP-A-0203165 under the name QPSX protocol, but in the meantime it has become better known in specialist circles by the name DQDB protocol, which name will also be used for it hereinafter.

According to the DQDB protocol, use is made of two transmission channels, in general data buses, with mutually opposing communication directions. A series of successive access units is connected to the two buses. The information to be transmitted is transferred from temporary storage to time slots of a fixed size (53 bytes).

Access units which have data to transmit select one of the two buses according to the destination of the data, for example. The data packets to be transmitted are dispatched via the time slots passing by in the chosen direction after first completing an access protocol relating to time slots for each time slot involved. This access protocol proceeds as follows:

An access unit which receives a report from outside the transmission system above described for transmission of a data packet in the transmission direction of bus 1 places, as soon as this is possible, a bus 1 request bit for a time slot (hereinafter referred to simply as a request bit) in a predetermined section of a time slot on bus 2. By this means the access units downstream in the transmission direction of bus 2, therefore upstream in the transmission direction of bus 1, are informed that a packet is ready for transmission on bus 1 and that these access units must allow an empty time slot to pass by on bus 1 for that packet. In this way, as it were, a distributed FIFO buffer is constructed for each bus. For this mechanism a so-called request counter, a so-called countdown counter and a so-called still to be transmitted or untransmitted request counter are provided for each bus in each access unit.

If an access unit has nothing to transmit, the passage of a request bit on bus 2, for example, results in the content of its request counter belonging to bus 2 being increased by one (incremented). The bus 2 request counter in every access unit downstream on bus 2 thus contains an indication of the number of requests for transmission slots on bus 1. Conversely, the request counter for bus 1 in every access unit downstream on bus 1 contains an indication of the number of requests for transmission slots on bus 2. Each empty time slot, i.e. each possibility for transmitting data, which passes by an access unit on bus 1 results in the content of the request counter of bus 2 at the same access unit being reduced by one (decremented), and vice versa regarding bus 2 and bus 1.

In the following discussion of what happens when an access unit does have a packet to transmit, the term "the relevant access unit" means a particular access unit taken as an example for the purpose of the explanation.

When the relevant access unit has received data for transmission on bus 1, the content of the request counter of bus 2 is transferred to the countdown counter of bus 1 and the request counter of bus 2 is reset to zero. The countdown counter consequently contains information with regard to the number of requests passed on or originated before the relevant access unit had a data packet ready for transmission and the bus 2 request counter from that point in time starts to record the information with regard to the number of requests which were passed on or originated after that data packet was ready for transmission. For the relevant access unit to be able to transmit this data packet, a request bit must be transmitted on bus 2; the first step for so doing is the incrementing of the contents of the request counter and the untransmitted request counter of bus 2. As soon as the relevant access unit becomes able to transmit a request bit on bus 2, the content of the untransmitted request counter is decremented. In principle, a request bit is transmitted for each data packet to be transmitted. When an empty time slot passes by on bus 1, the content of the countdown counter of bus 1 is decremented, and when the content of the countdown counter consequently becomes zero, a data packet may be dispatched on bus 1 in the first subsequent empty time slot.

A drawback of the DQDB protocol is that the capacity of the buses for the transmission of data is not put to optimum use, because a request bit always passes through to the end of the bus, so that the situation can arise that empty time slots are reserved when that is no longer necessary, because the access unit which transmitted this request bit has already been able to transmit its data.

Significantly another protocol which is known in specialist circles by the name $D^3Q$ protocol and which can be regarded as an improvement of the DQDB protocol has recently been proposed in the as yet unpublished Swiss Patent Application CH-A-00566/89-8. In this protocol use is made of the same reservation mechanism for time slots as in the DQDB protocol. An important difference from the DQDB protocol is, however, that request bits can be removed from a bus if they have become superfluous because the requesting access unit has already become able to transmit a data packet. This is called "erasure" of a request bit and is performed in the following way:

By means of an empty slot counter, each access unit records the number of empty time slots passing by on a bus for which no request has been submitted on the other bus. The empty slot counter thus contains information with regard to the number of possibilities for transmission which an access unit has allowed to pass through. If the content of the empty slot counter is not zero when a request is received on the other bus by means of a request bit in a time slot, it is then possible to erase that request bit by resetting it, because a possibility for transmission (an empty time slot) has already been allowed to pass through beforehand by the access unit. At the same time, the content of the empty slot counter is decremented, because one possibility for transmission is going to be used.

If the content of the empty slot counter is zero, each incoming request bit is allowed to pass through and the content of the request counter is incremented. The two counters can therefore never simultaneously have a content with a value greater than zero.

The request counter contains information with regard to the number of empty-time-slot requests either originated or passed on by the access unit on the particular channel. If the access unit has no packet to transmit the request counter content shows only passed-on requests. If in this situation an empty time slot passes by, the time slot is allowed to pass through and the content of the request counter is decremented.

In order to prevent a single empty time slot passing by several access units in each of which a request bit is reset, use is made of a handshake protocol which involves each station that receives and forwards an empty time slot, by which the content of the empty slot counter of an access unit is incremented. The preceding upstream access unit which forwarded the empty time slot needs to be informed that the empty time slot has been received. For this purpose a "handshake" request bit is transmitted in a time slot on the other bus, which results in the content of the empty slot counter in the preceding upstream access unit being decremented and the "handshake" request bit being erased (reset).

An advantage of the $D^3Q$ protocol over the DQDB protocol is that request bits no longer pass through the entire bus. They cease reserving further empty time slots as soon as the request bits have passed by "their" empty time slot.

However, if the $D^3Q$ protocol were to be combined with time slot erasure techniques, such as destination deletion, that is to say that emptying of a time slot when it has arrived at the packet destination, which can be desirable in order, on the one hand, to increase further the efficiency of the use of the transmission channels and, on the other hand, to make it possible to use the $D^3Q$ protocol in a ring structure, a problem arises which will be illustrated with reference to a), b) and c) of FIG. 1.

FIG. 1 shows, by way of example, three access units or stations 7, 8 and 9. The bus 1 is always indicated diagrammatically above these stations and the bus 2 below these stations. The time slots are shown, likewise diagrammatically, as rectangles and are divided into a first section in which, inter alia, a request bit can be placed, and a second section for the data. If one of these sections is hatched in the figure, this means that it contains, respectively, data or a request bit, while the numeral in the hatched section indicates the station for which the data is intended or the station which has originated the request bit. The stages a), b) and c) of FIG. 1 show three successive steps, in which a time slot moves to the next station between successive steps.

It is assumed that, as shown in FIG. 1a, station 7 is ready to transmit data. For this purpose that station places a request bit in a time slot which, seen in the figure, goes via the bus 2 to the left. In the stations 8 and 9 this request bit causes the content of the request counter (RC) to be incremented, which is indicated by RC=1. It is then assumed that as shown in FIG. 1b, a filled time slot arrives via the other bus with a data packet which is intended for station 8.

FIG. 1b shows that the status of station 9 does not change. Station 8 reads the contents of the time slot and erases these (destination deletion) and decrements the content of the request counter belonging to this station because an empty time slot, and thus a possibility for transmission, is forwarded. Subsequently, as is shown in FIG. 1c, station 7 can transmit its data in this empty time slot. However, in station 9 a request for an empty time slot is still recorded in the request counter, whereas station 7 has already transmitted the data. In this way, more time slots are thus reserved than are needed and the effective capacity of the bus is reduced.

If the $D^3Q$ protocol is to be used in a ring structure in which the ends of each of the buses are linked together, with a mechanism being provided for erasing the data contents from a time slot when it has reached its destination, this would lead to substantial problems because, as described above, request bits which have become superfluous remain recorded in request counters, which in the course of time would lead to a reduction in the effective capacity and ultimately to the complete standstill of communication on the ring.

SUMMARY OF THE INVENTION

The object of the invention is to provide a solution to this problem, by which it becomes possible, via a communications network having the configuration described above, both in a ring structure and in a structure with buses of finite length, to erase the information in time slots which have reached their destination, without this leading to a reduction in the effective capacity of the network, but, on the contrary, optimizing the utilizable capacity.

To this end the invention provides a method of the abovementioned type, with which not only data in a time slot can be erased, but each access unit which is able to erase data is able to reset (erase) received request bits. The number of request bits to be reset by an access unit is recorded for each bus in the access unit. A request bit on a transmission channel is reset by an access unit receiving the request bit when the number of request bits to be reset by the access unit on that channel is greater than the number of request bits still awaiting transmission by the access unit over that channel. More particularly, the method steps characterizing the invention require an additional counter for registering requests to be erased and are useful in 10 combinations of four events and seven criteria of contents of counters of an access unit set forth in FIG. 2. The method of the invention is further explained below in detail.

BRIEF DESCRIPTION OF THE DRAWINGS

In FIG. 2, the circled numerals (1) and (2) identify that bus (see FIG. 1) to which the counter relates for the case of data on bus (1) and time-slot requests on bus (2). The events are defined in Table I, see below, and the counter identification is in accordance with Table II, see below.

DESCRIPTION OF THE ILLUSTRATED DETAILS OF THE METHOD OF THE INVENTION

The method according to the invention can best be understood if it is explained with reference to the diagram of FIG. 2 which gives an overview of the various statuses (a)–(g) of an access unit and which then indicates, in the case of each of the specific events or occurrences 1–4, what action then results for each of the specified statuses in each of the 10 status and event combinations which distinguish the invention from the prior art which has already been described. In this context it is emphasized that this diagram shows only those statuses, occurrences (events) and actions in respect of which the method differs from the known DQDB or $D^3Q$ protocol; in respect of all of the combinations of status and event which are not shown in FIG. 2, the actions which result therefrom are the same as in the case of the already known DQDB or $D^3Q$ protocol referred to and explained above.

Figure 2:
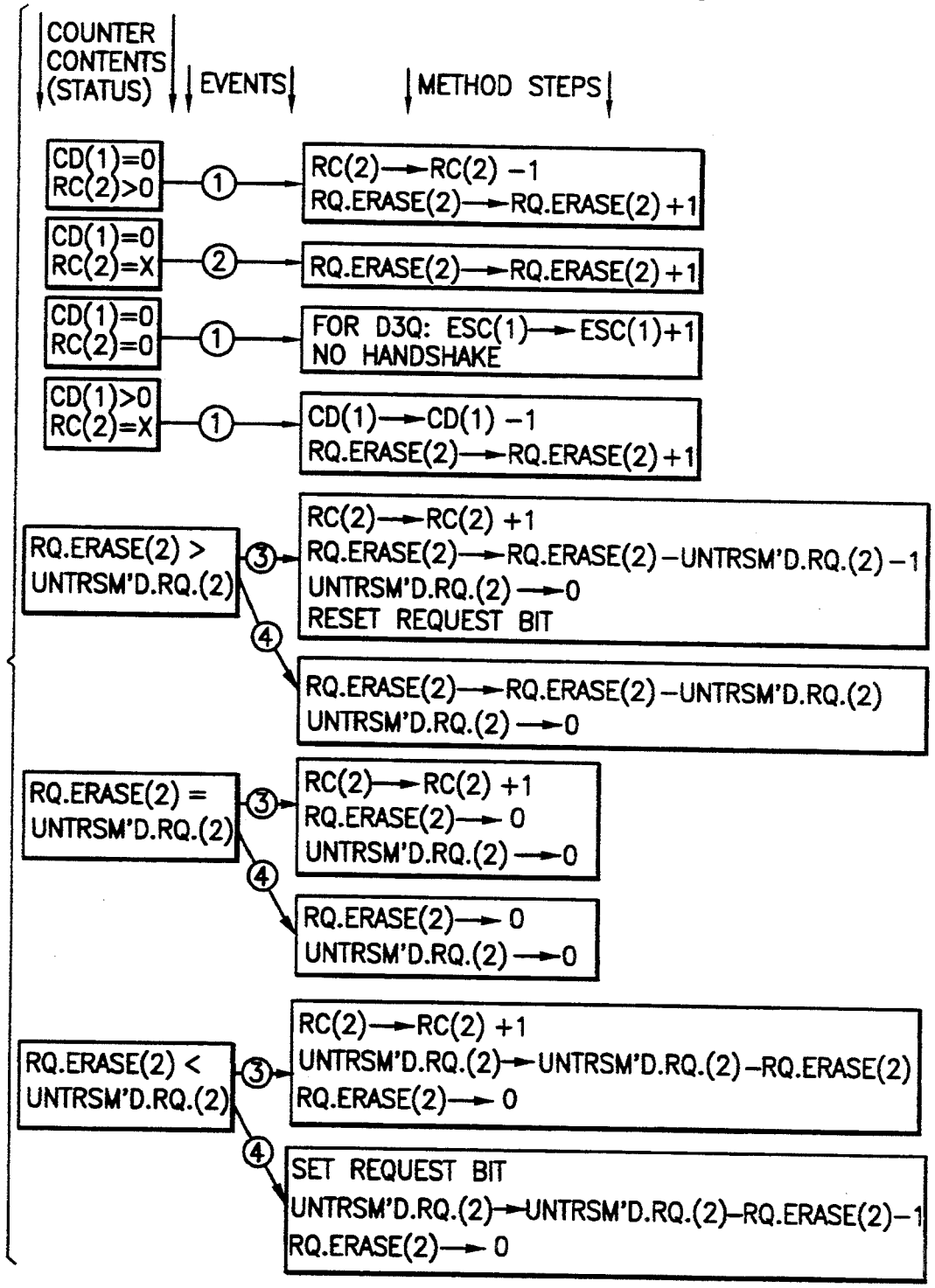
FIG. 2 is a status-and-event diagram of the use of the method of the invention in all the status and event combinations in which the method of the invention differs from the above described protocols.

In the rectangles of the FIG. 2 diagram it is assumed that the data are transmitted via bus 1 and that, therefore, the request bits are transmitted via bus 2. However, the method proceeds in the same way for transmission of data via bus 2 and of request bits via bus 1. Furthermore, in the FIG. 2 diagram a distinction is made between four different occurrences or events 1–4 defined below in TABLE 1, which can arise when a time slot passes by an access unit or station and which, respectively, have the following significances stated with reference to a particular station serving as an example:

TABLE I

1) A full time slot has arrived via bus 1 at a particular station and that time slot has been read, emptied and forwarded empty by said station;

2) A full time-slot has arrived on bus 1 at a particular station and that time-slot has been read, emptied and refilled by the station;

3) A time slot containing a request bit has arrived on bus 2 at a particular station; and 4) A time slot without a request bit has arrived on bus 2 at a particular station.

Furthermore, for reasons of clarity the abbreviations set forth below in TABLE II have been used in the FIG. 2 diagram for the various counters. The bus on which the content of a counter can be influenced by occurrences is indicated in FIG. 2, after the abbreviation, by the number 1 or 2 in parentheses.

TABLE II

RC : Request counter
CD : Countdown counter
RQ.ERASE : Request erase counter
UNTRSM'D RQ : Untransmitted request counter
ESC : Empty slot counter
Finally, the following abbreviation is also used:
X : Status unimportant If a time slot is emptied and forwarded empty by a particular station (occurrence 1) when requests are recorded at the station, which is the case if the content of the request counter is greater than 0 as shown in (a) status in FIG. 2, or when the countdown counter content is greater than 0 as shown in (d) status in FIG. 2, the station is then entitled to erase a request bit that has arrived on bus 2 and the content of the corresponding request erase counter is incremented. In addition, the content of the request counter and that of the countdown counter are decremented in the same way as in an above-described known protocol. If, however, the time slot is thus emptied when the content of both those two counters is zero (status (c)), nothing occurs in the case where only the DQDB protocol is in use. In the case of use of the $D^3Q$ protocol the content of the empty slot counter is incremented, but a $D^3Q$ handshake protocol is not carried out, which is to say that no handshake bit is transmitted and reset and that the content of the untransmitted request counter is not incremented.

If, in the event of an occurrence 2, a particular station empties a time slot and fills this again itself, which signifies that a data packet was already about to be transmitted, while at the same time the content of the corresponding countdown counter was zero (status (b)), the content of the request erase counter is then also incremented.

A station at which the content of a request erase counter is greater than 0 can erase as many received request bits as the content of the request erase counter indicates. If, on the other hand, the station in question itself still has untransmitted request bits to transmit, which is indicated by the content of the untransmitted request counter being greater than 0, request bits can then be erased only under the conditions which define the status (e), (f) or (g) set forth in the FIG. 2 diagram. For this purpose, the content of the untransmitted request counter and that of the request erase counter are first compared with one another and the higher content is reduced by the lower or possibly identical content. At the same time, if a time slot passing by contains a request bit (3e), the content of the request counter is incremented, and the request erase counter is decremented, while the untransmitted request counter is reset to zero.

If the content of the request erase counter is the higher (status (e)), a request bit which has been received is then reset. If the content of the untransmitted request counter is the higher (status (g)) the request bit then remains in position or a request bit is placed if it was not yet placed. If the content of the request erase counter is the same as that of the outstanding request counter (status (f)), the request bit is simply forwarded to the next station with the usual incrementation of the request counter.

If, however, a time slot arrives without a request on the request bus (event 4 of TABLE I and FIG. 2) there is of course no incrementation of the request counter. In status (e) (request erase counter has higher content than untransmitted request counter) no request bit is set and in status (g) (untransmitted request counter has higher content) a request bit is set, as shown in FIG. 2, and the untransmitted request counter is decremented, while the request erase counter is reset to zero.

By means of the invention, with which time slot erasure techniques are combined with queuing protocols such as the DQDB and the $D^3Q$ protocol, a protocol is obtained with which the capacity of the transmission system is utilized in a more efficient manner because requests are prevented from remaining in access unit counters unnecessarily. Moreover, by means of the measures according to the invention, the principles of both of the DQDB and $D^3Q$ protocols can also be used in a ring structure. Without the measures of the invention those two principles when applied in a ring structure would inexorably lead to considerable problems.

When a time-slot has room for a data packet, it is referred to as "empty" because a data packet fills a large portion of a time slot. When a time slot has room for a request bit, it is referred to as an unfilled time-slot.

Figure 1:
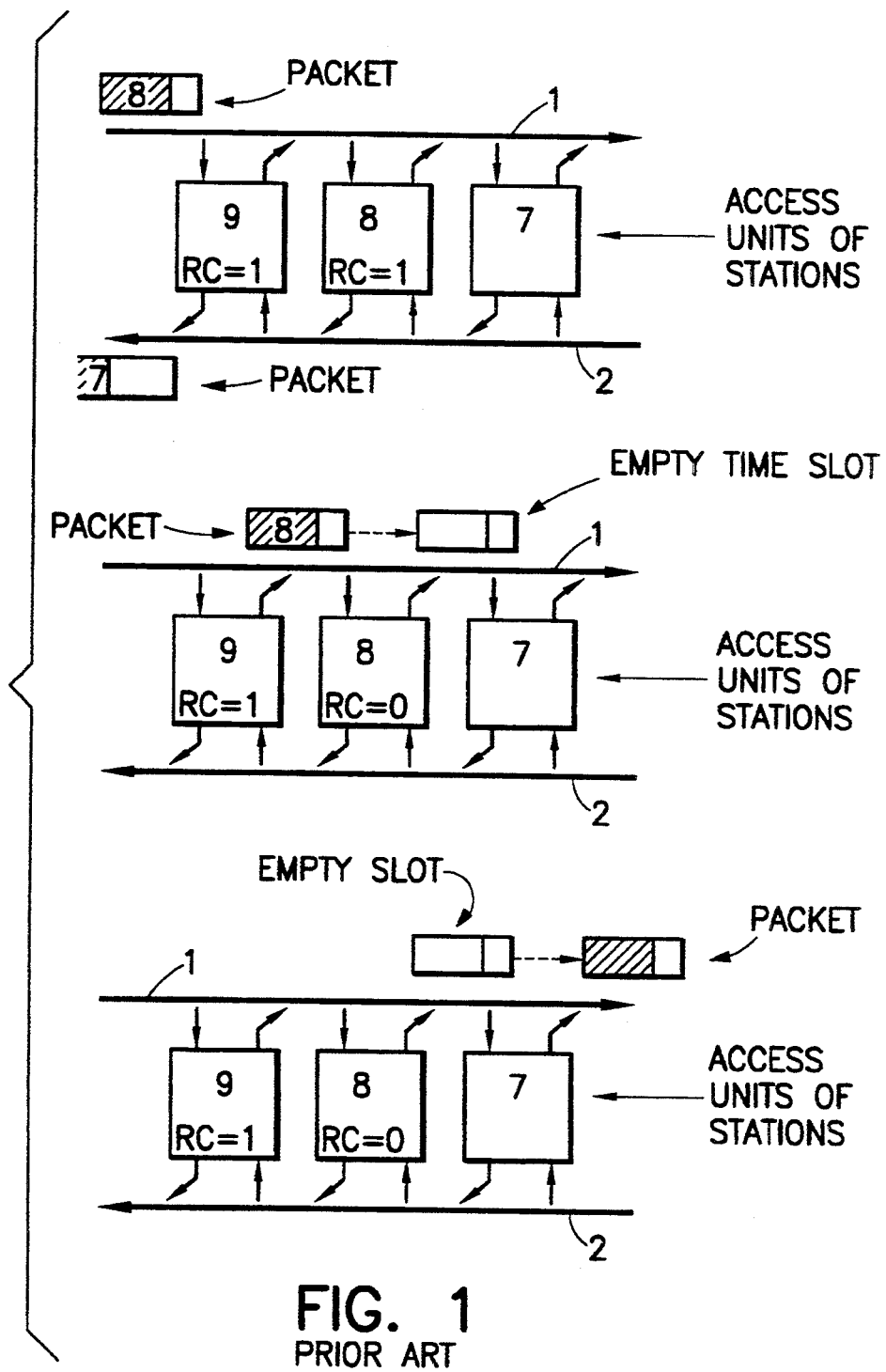
FIG. 1 illustrates three successive stages a), b) and c) of prior art protocol for packet transmission which has already been described.

Since the invention has been described in detail with reference to FIGS. 1 and 2 for the case of transmission of data on bus 1 and transmission of request bits on bus 2, although the invention also applies conversely to the case of transmission data on bus 2 and transmission of request bits on bus 1, it is to be understood that in the claims the term "first transmission channel" may refer to either bus 1 or bus 2 of the invention as identified in the drawings and the foregoing description. As applied to a physical communications network which has two unidirectional transmission channels of opposing transmission direction, the expression "first transmission channel" must be taken to apply in the alternative to both of the two transmission channels of the same physical communication network of the aforesaid kind.

I claim:

1. Method for transmitting information in the form of data packets in a communications network which comprises two unidirectional transmission channels of opposing transmission directions and a succession of access units for respective successive stations for origination and destinations of packets, each of which access units is linked both to a first and to a second of said transmission channels, information being moved, under the control of clock signals and time-slots generated thereby, respectively from the first to the last access unit linked to the first transmission channel and from the last to the first access unit linked to the second transmission channel, said time slots being successively generated so as to comprise always the same predetermined number of clock signal periods, each of which time slots and packets having a major portion for information bits and a minor portion for time-slot-reservation request bits, hereinafter referred to as request bits, that are subject to be set and to be reset at an access unit, first counting means in each access unit for recording the number of request bits passed on, to said each access unit on each of said transmission channels, second counting means for recording the number of untransmitted request bits awaiting transmission by said each access unit on each of said transmission channels, third counting means in each access unit for each of said transmission channels for counting down request bits transferred from said first counting means in said each access unit, said transferred request bits being transferred when a packet becomes ready for transmission on the transmission channel to which said third counting means relates, and fourth counting means in said each access unit, for each of said transmission channels, for counting empty slots arriving at said each access unit respectively on said first and second channels for which no request bit has been set and transmitted by said each access unit so that the slots are passed onward empty, said method including the following steps:
when said each access unit has nothing ready to transmit on said first transmission channel and receives and passes on a request bit on said second transmission channel, the content of said first counting means for said second transmission channel is incremented:
when said each access unit has nothing to transmit on said first transmission channel and an empty time slot passes by said each access unit on said first transmission channel, the content of said first counting means for said second transmission channel is decremented and the content of said fourth counting means for said first transmission channel is incremented and when an empty time slot passes by said each access unit on said second transmission channel, the content of said first counting means for said first transmission channel is decremented and the content of said fourth counting means for said second transmission channel is decremented;
when said each access unit has a packet ready for transmission on said first transmission channel, the content of said second counting means for said second transmission channel is incremented and as soon as an unfilled slot passes by on said second transmission channel a request bit is transmitted thereon and the content of said second counting means for said second transmission channel is decremented;
when said each access unit has a packet ready for transmission on said first transmission channel, the content of said first counting means for said second transmission channel is transferred to said third counting means for said first transmission channel and the content of said first counting means for said second transmission channel is reset to zero, and before transmitting said packet said each access unit must increment the content of said second counting means for said second transmission channel and thereafter transmit a request bit on said second transmission channel, whereupon the content of said second counting means for said second transmission channel is decremented,
whenever said each access unit has succeeded in transmitting a packet while its third counting means has a content greater than zero, the content of third counting means is decremented and when the content of said third counting means is zero, and another packet is ready for transmission on the corresponding transmission channel, said packet is transmitted in the first subsequent empty time slot on said corresponding transmission channel;
by means of said fourth counting means, the number of empty time slots forwarded by said each access unit is registered and every access unit which forwards a received empty time-slot a respective fourth counting means is incremented and a request bit is transmitted in the opposite direction to an access unit in which the content of a corresponding fourth counting means is decremented, and
when the content of said fourth counting means of said each access unit for said first transmission channel is greater than zero and a request bit is received on said second transmission channel, said request bit is reset and the content of said fourth counting means for said first transmission channel is decremented,
characterized in that the following method steps are performed:
when the content of said fourth counting means of said each access unit for said first transmission channel is zero, each incoming request bit on said second transmission channel is passed along by said each access unit and the content of said first counting means of said access unit for said second transmission channel is incremented, and when a time-slot is emptied and is forwarded empty by said each access unit on said first transmission channel while at said each access unit said third counting means for said first transmission channel and said first counting means for said second channel are both of zero content, the content of said fourth counting means for said first transmission channel is incremented, and neither a transmission of a request bit on said second transmission channel nor decrementation of content of the fourth counting means and at another access unit is performed.

2. The method of claim 1, further comprising a fifth counting means for determining when resetting of a request bit is needed in each said access units for each of said transmission channels;

said method further including the following steps:
when the third counting means of each said access units for said first transmission channel has a zero content and the first counting means for each said second transmission channel has a content greater than zero and each said access unit has no packet ready to transmit on said first transmission channel and receives on said first transmission channel a packet for which at least one of said access units is the destination, said one access unit responds by reading said received packet, emptying the data portion of said time slot, incrementing content of its said fifth counting means for said second transmission channel and decrementing the content of its said first counting means for said first transmission channel, and when said third counting means of each said access units for said first transmission channel has a content greater than zero and each said access unit has no packet ready to transmit on said first transmission channel and receives on said first transmission channel a packet for which at least one of said access units is the destination, said at least one access unit responds by reading said packet, emptying the data portion of said received time slot, incrementing content of its said fifth counting means for said second transmission channel and decrementing the content of its said third counting means for said first transmission channel, whereby the foregoing two alternate responses of said access units signify that a previous step is necessary when said packet is received, to determine whether said content of said third counting means for said first transmission channel is zero and, if so, whether the content of said first counting means for said second transmission channel is greater than zero.

3. The method of claim 2, further including the following method steps:
when one of each said access units has a packet ready for transmission over said first transmission channel and receives over said first transmission channel a time slot containing a packet of which said one access unit is the destination and said third counting means of said one access unit for said first transmission channel has zero content, the content of said fifth counting means of said one access unit for said second transmission channel is incremented, whereby a basis is provided for resetting one request bit on said second transmission channel in addition to request bits, if any, previously subject to erasure but not yet erased on said second transmission channel.

4. The method of claim 2, further including the following method steps:
when a time slot containing a request bit arrives at one of each said access units on said second transmission channel while said fifth counting means of said one access unit for said second transmission channel has a content greater than that of said second counting means of said one access unit for said second transmission channel, said one access unit responds by resetting said request bit contained in said arrived time slot, incrementing the content of its said first counting means for said second transmission channel, reducing the content of its said fifth counting means by one more than the content of its said second counting means, for said second transmission channel, and resetting to zero the content of its said second counting means for said second transmission channel;

when a time slot containing a request bit arrives at said one access unit on said second transmission channel while said second counting means and said fifth counting means, both of said one access unit for said second transmission channel, each have a content equal to the content of the other, said one access unit responds by resetting to zero the contents of both its said second and fifth counting means for said second transmission channel and by incrementing said first counting means for said second transmission channel, and when a time slot containing a request bit arrives at said one access unit on said second transmission channel while said second counting means of said one access unit for said second transmission channel has a content greater than the content of said fifth counting means of said one access unit for said second transmission channel, said one access unit responds by decrementing, by the content of its said second counting means, the content of its said fifth counting means, both said last-mentioned means serving said second transmission channel, incrementing the content of its said first counting means for said second transmission channel and resetting to zero the content of its said fifth counting means for said second transmission channel, whereby the foregoing three alternate responses of said one access unit signify that, prior to the above defined responses of said one access unit, a previous step of determining the relative magnitudes, in terms of at least sense or equality, of the contents of said fifth and second counting means of said one access unit for said second transmission channel must be previously performed to determine which of the three above-stated responses of said one access unit must follow the arrival of a said time slot.

5. The method of claim , further including the following method steps:
when a time slot containing no request bit arrives at one of each said access units on said second transmission channel while said fifth counting means of said one access unit for said second transmission channel has a content greater than that of said second counting means of said one access unit for said second transmission channel, no request bit is set in said time slot and said one access unit responds by reducing the content of its said fifth counting means by the content of its said second counting means, for said second transmission channel, and resetting to zero the content of its said second counting means for said second transmission channel;

when a time slot containing no request bit arrives at said one access unit on said second transmission channel while said second counting means and said fifth counting means, both of said one access unit for said second transmission channel, each have a content equal to the content of the other, said one access unit responds by resetting to zero the respective contents of its said second and fifth counting means for said second transmission channel, and when a time slot containing no request bit arrives at said one access unit on said second transmission channel while said second counting means of said one access unit for said second transmission channel has a content greater than that of said fifth counting means of said one access unit for said second transmission channel, said one access unit responds by setting and transmitting a request bit in said time slot of said second transmission channel, decrementing the content of its said second counting means for said second transmission channel by one more than the content of its said fifth counting means for said second transmission channel and resetting to zero the content of its said fifth counting means for said second transmission channel, whereby the foregoing three alternate responses of said one access unit signify that, prior to the above a previous step of determining the relative magnitudes, in term of at least sense or equality of the contents of said additional and second counting means of said one access unit for said second transmission channel must be previously performed to determine which of the three above-stated responses of said one access unit must follow the arrival of a said time slot.

6. The method of claim 1, further comprising a fifth counting means for determining when resetting of a request bit is needed in each said access units for each of said transmission channels and in that the following method steps are performed:, said method further including the following steps:

when one of each said access units has a packet ready for transmission over said first transmission channel and receives over said first transmission channel a time slot containing a packet of which any one of said access units is the destination and said third counting means of said one access unit for said first transmission channel has zero content, the content of said fifth counting means of said one access unit for said second transmission channel is incremented, whereby a basis is provided for resetting one request on said second transmission channel in addition to requests, if any, previously subject to erasure but not yet erased on said second transmission channel.

7. The method of claim 1, further comprising a fifth counting means for determining when resetting of a request bit is needed in each said access units for each of said transmission channels, said method further including the following steps:

when a time slot containing a request bit arrives at one of said access units on said second transmission channel while said fifth counting means of said one access units for said second transmission channel has a content greater than that of said second counting means of said one access unit for said second transmission channel, said one access unit responds by resetting said request bit contained in said arrived time slot, incrementing the content of its said first counting means for said second transmission channel, reducing the content of its said fifth counting means by one more than the content of its said second counting means, for said second transmission channel, and resetting to zero the content of its said second counting means for said second transmission channel;

when a time slot containing a request bit arrives at said one of said access units on said second transmission channel while said second counting means and said fifth counting means of both of said one access unit for said second transmission channel, each have a content equal to the content of the other, said one access unit responds by resetting to zero the contents of both its said second and fifth counting means for said second transmission channel and by incrementing the content of its said first counting means for said second transmission channel, and when a time slot containing a request bit arrives at said one of said access units on said second transmission channel while said second counting means of said one access unit for said second transmission channel has a content greater than the content of said fifth counting means of said one access unit for said second transmission channel, said one access unit responds by decrementing, by the content of its said second counting means, the content of its said fifth counting means, both said last-mentioned means serving said second transmission channel, incrementing the content of its said first counting means for said second transmission channel and resetting to zero the content of its said fifth counting means for said second transmission channel, whereby the foregoing three alternate responses of said one access unit signify that, prior to the above defined responses of said one access unit, a previous step of determining the relative magnitudes, in terms of at least sense or equality, of the contents of said fifth and second counting means of said one access unit for said second transmission channel must be previously performed to determine which of the three above-stated responses of said one access unit must follow the arrival of a said time slot.

8. The method of claim further comprising a fifth counting means for determining when resetting of a request bit is needed in each said access units for each of said transmission channels, said method further including the following steps:

when a time slot containing no request bit arrives at one of said access units on said second transmission channel while said fifth counting means of said one access unit for said second transmission channel has a content greater than that of said second counting means of said one access unit for said second transmission channel, no request bit is set in said time slot and said one access unit responds by reducing the content of its said fifth counting means by the content of its said second counting means, for said second transmission channel, and resetting to zero the content of its said second counting means for said second transmission channel;

when a time slot containing no request bit arrives at said one access unit on said second transmission channel while said second counting means and said fifth counting means, both of said one access unit for said second transmission channel, each have a content equal to the content of the other, said one access unit responds by resetting to zero the respective contents of its said second and fifth counting means for said second transmission channel, and when a time slot containing no request bit arrives at said one access unit on said second transmission channel while said second counting means of said one access unit for said second transmission channel has a content greater than that of said fifth counting means of said one access unit for said second transmission channel, said one access unit responds by setting and transmitting a request bit in said time slot of said second transmission channel, decrementing the content of its said second counting means for said second transmission channel by one more than the content of its said fifth counting means for said second transmission channel and resetting to zero the content of its said fifth counting means for said second transmission channel, whereby the foregoing three alternate responses of said one access unit signify that, prior to the above, a previous step of determining the relative magnitudes, in term of at least sense or equality, of the respective contents of said fifth and second counting means of said one access unit for said second transmission channel must be previously performed to determine which of the three above-stated responses of said one access unit must follow the arrival of a said time slot.

9. Method for transmitting information in the form of data packets in a communications network which comprises two unidirectional transmission channels of opposing transmission directions and a succession access units for respective successive stations for origination and destinations of packets, each of which access units is linked both to a first and to a second of said transmission channels, information being moved, under the control of clock signals and time slots generated thereby, respectively from the first to the last access unit linked to the first transmission channel and from the last to the first access unit linked to the second transmission channel, said time slots being successively generated so as to comprise always the same predetermined number of clock signal periods, each of which time slots and packets having a major portion for information bits and a minor portion for time slot reservation request bits, hereinafter referred to as request bits, that are subject to be set and to be reset at an access unit, first counting means in each access unit for recording the number of request bits passed on to said each access unit on each of said transmission channels at said each access unit, second counting means for recording the number of untransmitted request bits awaiting transmission by said each access unit on each of said transmission channels, and third counting means in each access unit for each of said transmission channels for counting down request bits transferred from said first counting means in said each access unit, said transferred request bits being transferred when a packet becomes ready for transmission on the transmission channel to which said third counting means relates, said method including the following steps:

when said each access unit has nothing ready to transmit on said first transmission channel and receives and passes on a request bit on said second transmission channel, the content of said first counting means for said second transmission channel is incremented;

when said each access unit has a packet ready for transmission on said first transmission channel, the content of at least said second counting means for said second transmission channel is incremented and as soon as an unfilled slot passes by on said second transmission channel a request bit is transmitted thereon, and the content of said second counting means for said second transmission channel is decremented;

when each said access unit has a packet ready for transmission on said first transmission channel, the content of said first counting means for said second transmission channel is transferred to said third counting means for said first transmission channel and said first counting means for said second transmission channel is reset to zero content, and before transmitting said packet, in each said access unit, the content of said second counting means for said second transmission channel is incremented, a request bit is transmitted on said second transmission channel, and the content of said second counting means for said second transmission channel is decremented; and whenever each said access unit has succeeded in transmitting a packet while the corresponding third counting means has a content greater than zero, the content of said corresponding third counting means is decremented and when the content of said corresponding third counting means is zero and another packet is ready for transmission on the corresponding transmission channel, said packet is transmitted in the first subsequent empty time slot on said corresponding transmission channel, wherein an additional counting means is provided for determining when resetting of a request bit is needed in each said access units for each of said transmission channels;

wherein the following further method steps are performed:

(a) when at each said access unit its said third counting means for said first transmission channel has a content of zero and said first counting means for said second transmission channel has a content greater than zero, and each said access unit, while having no packet of its own ready to transmit on said first transmission channel, receives on said first transmission channel a packet for which each said access unit is the destination, each said access unit responds by reading said received packet, emptying the data portion of said time slot, incrementing the content of said additional counting means for said second transmission channel and decrementing the content of said first counting means for said first transmission channel, and (b) when at each said access unit, said third counting means for said first transmission channel has a content greater than zero and each said access unit, while having no packet ready to transmit on said first transmission channel, receives on said first transmission channel a packet for which each said access unit is the destination, each said access unit responds by reading said packet, emptying the data portion of said received time slot, incrementing said additional counting means for said second transmission channel and decrementing said third counting means for said first transmission channel, whereby the two alternate responses of each said access unit signify that a previous step is necessary before or when said packet is received, to determine whether said content of said third counting means for said first transmission channel is zero and, if so, whether the content of said first counting means for said second transmission channel is greater than zero.

10. The method of claim 9, further including the following method steps:

when a time slot containing a request bit arrives at one of said access units on said second transmission channel while said additional counting means of said one access unit for said second transmission channel has a content greater than that of said second counting means of said one access unit for said second transmission channel, said one access unit responds by resetting said request bit contained in said arrived time slot, incrementing the content of its said first counting means for said second transmission channel, reducing the content of its said additional counting means by one more than the content of its said second counting means, for said second transmission channel, and resetting to zero the content of its said second counting means for said second transmission channel;

when a time slot containing a request bit arrives at said one access unit on said second transmission channel while said second counting means and said additional counting means, both of said one access unit for said second transmission channel, each have a content equal to the content of the other, said one access unit responds by resetting to zero the contents of both its said second and additional counting means for said second transmission channel and by incrementing its said first counting means for said second transmission channel, and when a time slot containing a request bit arrives at said one access unit on said second transmission channel while said second counting means of said one access unit for said second transmission channel has a content greater than the content of said additional counting means of said one access unit for said second transmission channel, said one access unit responds by decrementing, by the content of its said second counting means, the content of its said additional counting means, both said last-mentioned means serving said second transmission channel, incrementing its said first counting means for said second transmission channel and resetting to zero the content of its said additional counting means for said second transmission channel, whereby the foregoing three alternate responses of said one access unit signify that, prior to the above defined responses of said one access unit, a previous step of determining the relative magnitudes, in terms of at least sense or equality, of the contents of said additional and second counting means of said one access unit for said second transmission channel must be previously performed to determine which of the three above-stated responses of said one access unit must follow the arrival of a said time slot.

11. The method of claim 9, further including the following method steps:

when a time slot containing no request bit arrives at one of said access units on said second transmission channel while said additional counting means of said one access unit for said second transmission channel has a content greater than that of said second counting means of said one access unit for said second transmission channel, no request bit is set in said time slot and said one access unit responds by reducing the content of its said additional counting means by the content of its said second counting means, for said second transmission channel, and resetting to zero the content of its said second counting means for said second transmission channel;

when a time slot containing no request bit arrives at said one access unit on said second transmission channel while said second counting means and said additional counting means, both of said one access unit for said second transmission channel, each have a content equal to the content of the other, said one access unit responds by resetting to zero the respective contents of its said second and additional counting means for said second transmission channel, and when a time slot containing no request bit arrives at said one access unit on said second transmission channel while said second counting means of said one access unit for said second transmission channel has a content greater than that of said additional counting means of said one access unit for said second transmission channel, said one access unit responds by setting and transmitting a request bit in said time slot of said second transmission channel, decrementing the content of its said second counting means for said second transmission channel by one more than the content of its said additional counting means for said second transmission channel and resetting to zero the content of its said additional counting means for said second transmission channel, whereby the foregoing three alternate responses of said access unit signify that, prior to the above a previous step of determining the relative magnitudes, in term of at least sense or equality, of the contents of said additional and second counting means of said one access unit for said second transmission channel must be previously performed to determine which of the three above-stated responses of said one access unit must follow the arrival of a said time slot.

12. Method for transmitting information in the form of data packets in a communications network which comprises two unidirectional transmission channels of opposing transmission directions and a succession of access units for respective successive stations for origination and destinations of packets, each of which access units is linked both to a first and to a second of said transmission channel, information being moved, under the control of clock signals and time slots generated thereby, respectively from the first to the last access unit linked to the first transmission channel and from the last to the first access unit linked to the second transmission channel, said time slots being successively generated so as to comprise always the same predetermined number of clock signal periods, each of which time slots and packets having a major portion for information bits and a minor portion for time slot reservation request bits, hereinafter referred to as request bits that are subject to be set and to be reset in a said access unit, first counting means in each access unit for recording the number of request bits to each of said transmission channels at said each access units, second counting means for recording the number of untransmitted request bits awaiting transmission by said each access unit on each of said transmission channels, third counting means in said each access unit for each of said transmission channels for counting down request bits transferred from a said first counting means in said each access unit, said transferred request bits being transferred when a packet becomes ready for transmission on the transmission channel to which said third counting means relates, said method including the steps of:

when said each access unit has nothing ready to transmit on said first transmission channel and receives and passes on a request bit on said second transmission channel, the content of said first counting means for said second transmission channel is incremented, when said each access unit has a packet ready for transmission on said first transmission channel, the content of at least said second counting means for said second transmission channel is incremented and as soon as an unfilled slot passes by on said second transmission channel a request bit is transmitted thereon, and the content of said second counting means for said second transmission channel is decremented;

when each said access unit has a packet ready for transmission on said first transmission channel, the content of said first counting means for said second transmission channel is transferred to said third counting means for said first transmission channel and said first counting means for said second transmission channel is reset to zero content, and before transmitting each packet, in each said access unit, the content of said second counting means for said second transmission channel is incremented, and a request bit is transmitted on said second transmission channel, and the content of said second counting means for said second transmission channel is decremented; and whenever each said access unit has succeeded in transmitting a packet while the corresponding third counting means has a content greater than zero, the content of said corresponding third counting means is decremented and when the content of said corresponding third counting means is zero and another packet is ready for transmission on the corresponding transmission channel, said packet is transmitted in the first subsequent empty time slot on said corresponding transmission channel, wherein an additional counting means is provided for determining when resetting of a request bit is needed in each said access units for each of said transmission channels, and wherein the following method steps are performed:

when said each access unit has a packet ready for transmission over said first transmission channel and receives over said first transmission channel a time slot containing a packet of which said access unit is the destination and said third counting means of said each access unit for said first transmission channel has zero content, the content of said additional counting means of said each access unit for said second transmission channel is incremented, to provide a basis for resetting one request on said second transmission channel in addition to requests, if any, previously becoming subject to erasure but not yet erased on said second transmission channel.

13. The method of claim 12, further including the following method steps:

when a time slot containing a request bit arrives at one of said access units on said second transmission channel while said additional counting means of said one access unit for said second transmission channel has a content greater than that of said second counting means of said one access unit for said second transmission channel, said one access unit responds by resetting said request bit contained in said arrived time slot, incrementing the contents of its said first counting means for said second transmission channel, reducing the content of its said additional counting means for said second transmission channel by one more than the content of its said second counting means, and resetting to zero the content of its said second counting means for said second transmission channel;

when a time slot containing a request bit arrives at said one access unit on said second transmission channel while said second counting means and said additional counting means, both of said one access unit for said second transmission channel, each have a content equal to the content of the other, said one access unit responds by resetting to zero the contents of both its said second and additional counting means for said second transmission channel and by incrementing its said first counter means for said second transmission channel, and when a time slot containing a request bit arrives at said one access unit on said second transmission channel while said second counting means of said one access unit for said second transmission channel has a content greater than the content of said additional counting means of said one access unit for said second transmission channel, said one access unit responds by decrementing, by the content of its said second counting means, the content of its said additional counting means, both said last-mentioned counting means serving said second transmission channel, incrementing the content of its said first counting means for said second transmission channel and resetting to zero the content of its said additional counting means for said second transmission channel, whereby the foregoing three alternate responses of said one access unit signify, prior to the above defined responses of said one access unit, a previous step of determining the relative magnitudes, in terms of at least sense or equality, of the contents of said additional and second counting means of said one access unit for said second transmission channel must be previously performed to determine which of the three above-stated responses of said one access unit must follow the arrival of a said time slot.

14. The method of claim 12, further including the following method steps:

when a time slot containing no request bit arrives at one of said access units on said second transmission channel while said additional counting means of said one access unit for said second transmission channel has a content greater than that of said second counting means of said one access unit for said second transmission channel, no request bit is set in said time slot and said one access unit responds by reducing the content of its said additional counting means for said second transmission channel by the content of its said second counting means, and resetting to zero the content of its said second counting means for said second transmission channel;

when a time slot containing no request bit arrives at said one access unit on said second transmission channel while said second counting means and said additional counting means, both of said one access unit for said second transmission channel, each have a content equal to the content of the other, said one access unit responds by resetting to zero the respective contents of its said second and additional counting means for said second transmission channel, and when a time slot containing no request bit arrives at said one access unit on said second transmission channel while said second counting means of said one access unit for said second transmission channel has a content greater than that of said additional counting means of said one access unit for said second transmission channel, said one access unit responds by setting and transmitting a request bit in said time slot of said second transmission channel, decrementing the content of its said second counting means for said second transmission channel by one more than the content of its said additional counting means for said second transmission channel and resetting to zero the content of its said additional counting means for said second transmission channel, whereby the foregoing three alternate responses of said one access unit signify that, prior to the above described responses of said one access unit, a previous step of determining the relative magnitudes, in terms of at least sense or equality of the contents of said additional and second counting means of said one access unit for said second transmission channel must be previously performed to determine which of the three above-stated responses of said one access unit must follow the arrival of a said time slot.

15. Method for transmitting information in the form of data packets in a communications network which comprises two unidirectional transmission channels of opposing transmission directions and a succession of access units for respective successive stations for origination and destinations of packets, each of which access units is linked both to a first and to a second of said transmission channels, information being moved, under the control of clock signals and time slots generated thereby, respectively from the first to the last access unit linked to the first transmission channel and from the last to the first access unit linked to the second transmission channel, said time slots being successively generated so as to comprise always the same predetermined number of clock signal periods, each of which time slots and packets having a major portion for information bits and a minor portion for time slot reservation request bits, hereinafter referred to as request bits, that are subject to be set and to be reset in said each access unit, first counting means in said each access unit for recording the number of request bits to each of said transmission channels, second counting means for recording the number of untransmitted request bits awaiting transmission by said each access unit on each of said transmission channels, third counting means in each said access unit for each of said transmission channels for counting down request bits transferred from a said first counting means in said each access unit, said transferred request bits being transferred when a packet becomes ready for transmission on the transmission channel to which said third counting means relates, said method including the steps of:

when said each access unit has nothing ready to transmit on said first transmission channel and receives and passes on a request bit on said second transmission channel, the content of said first counting means for said second transmission channel is incremented, when said each access unit has a packet ready for transmission on said first transmission channel, the contents of said first and second counting means for said second transmission channel are incremented, and as soon as an unfilled slot passes by on said second transmission channel, a request bit is transmitted thereon, and the content of said second counting means for said second transmission channel is decremented;

when said each access unit has a packet ready for transmission on said first transmission channel, the content of said first counting means for said second transmission channel is transferred to said third counting means for said first transmission channel and said first counting means for said second transmission channel is reset to zero content, and before transmitting said packet, said each access unit increments the content of said second counting means for said second transmission channel and transmits a request bit on said second transmission channel, and the content of its said second counting means for said second transmittal channel is decremented, and whenever said each access unit succeeds in transmitting a packet while its corresponding third counting means has a content greater than zero, the content of said corresponding third counting means is decremented and when the content of said corresponding third counting means is zero and another packet is ready for transmission on the corresponding transmission channel, said another packet is transmitted in the first subsequent empty time slot on said corresponding transmission channel, wherein an additional counting means is provided for determining when resetting of a request bit is needed in said access units for each of said transmission channels, and wherein the following method steps are performed:

(a) when a time slot containing a request bit arrives at said each access unit on said second transmission channel while said additional counting means of said each access unit for said second transmission channel has a content greater than that of said second counting means of said each access unit for said second transmission channel, said each access unit responds by resetting said request bit contained in said arrived time slot, incrementing the content of its said first counting means for said second transmission channel, reducing the content of said additional counting means by one more than the content of said second counting means for said second transmission channel, and resetting to zero the content of said second counting means for said second transmission channel;

(b) when a time slot containing a request bit arrives at said each access unit on said second transmission channel while said second counting means and said additional counting means, of both of said each access units for said second transmission channel, each, have a content equal to the content of the other, said each access unit responds by resetting to zero the respective contents of both its said second and additional counting means for said second transmission channel and by incrementing the content of its said first counting means for said second transmission channel, and (c) when a time slot containing a request bit arrives at said each access unit on said second transmission channel while said second counting means of said each access unit for said second transmission channel has a content greater than the content of said additional counting means of said each access unit for said second transmission channel, said each access unit responds by decrementing, by the content of its said second counting means, the content of its said additional counting means, wherein both said last-mentioned means serve said second transmission channel, incrementing the content of said first counting means for said second transmission channel, and resetting to zero the content of its said additional counting means for said second transmission channel, whereby the foregoing three alternate responses of said each access unit signify that, prior to the above defined responses of said each access unit, a previous step of determining the relative magnitudes, in terms of at least sense or equality, of the contents of said additional and second counting means of said each access unit for said second transmission channel must be previously performed to determine which of the three above-stated responses of said each access unit will be made following the arrival of said time slot.

16. Method for transmitting information in the form of data packets in a communications network which comprises two unidirectional transmission channels of opposing transmission directions and a succession access units for respective successive stations for origination and destinations of packets, each of which access units is linked both to a first and to a second of said transmission channels, information being moved, under the control of clock signals and time slots generated thereby, respectively from the first to the last access unit linked to the first transmission channel and from the last to the first access unit linked to the second transmission channel, said time slots being successively generated so as to comprise always the same predetermined number of clock signal periods, each of which time slots and packets having a major portion for information bits and a minor portion for time slot reservation request bits, hereinafter referred to as request bits, that are subject to be set and to be reset at said each access unit, first counting means in said each access unit for recording the number of request bits said each access unit in each of said transmission channels, second counting means for recording the number of untransmitted request bits awaiting transmission by said each access unit on each of said transmission channels, third counting means in said each access unit for each of said transmission channels for counting down request bits transferred from a said first counting means in the same access unit for serving a different one of said transmission channels, said transferred request bits being transferred when a packet becomes ready for transmission on the transmission channel to which said third counting means relates, when said each access unit has nothing ready to transmit on said first transmission channel and receives and passes on a request bit on said second transmission channel, the content of said first counting means for said second transmission channel is incremented:

when said each access unit has a packet ready for transmission on said first transmission channel, the contents of said first and second counting means for said second transmission channel are incremented and as soon as an unfilled slot passes by on said second transmission channel a request bit is transmitted thereon and the content of said second counting means for said second transmission channel is decremented;

when said each access unit has a packet ready for transmission on said first transmission channel, the content of its said first counting means for said second transmission channel is transferred to its said third counting means for said first transmission channel and said first counting means for said second transmission channel is reset to zero content, and, before transmitting said packet, said each access unit increments said second counting means for said second transmission channel and thereafter transmits a request bit on said second transmission channel, and decrements the content of its said second counting means for said second transmittal channel, and whenever each said access unit succeeds in transmitting a packet while the corresponding third counting means has a content greater than zero, the content of said corresponding third counting means is decremented and when the content of said corresponding third counting means is zero, and another packet is ready for transmission on the corresponding transmission channel, said another packet is transmitted in the first subsequent empty time slot on said corresponding transmission channel, wherein an additional counting means is provided for determining when resetting of a request bit is needed in said access units for each of said transmission channels, and wherein the following method steps are performed:

(a) when a time slot containing no request bit arrives at said each access unit on said second transmission channel while said additional counting means of said each access unit for said second transmission channel has a content greater than that of said second counting means of said each access unit for said second transmission channel, no request bit is set in said time slot, and said each access unit responds by reducing the content of said additional counting means by the content of said second counting means for said second transmission channel, and resetting to zero the content of said second counting means for said second transmission channel;

(b) when a time slot containing no request bit arrives at said each access unit on said second transmission channel while said second counting means and said additional counting means, of both of said each access units for said second transmission channel, each, have a content equal to the content of the other, said access unit responds by resetting to zero the respective contents of said second counting means and the additional counting means for said second transmission channel, and (c) when a time slot containing no request bit arrives at said each access unit on said second transmission channel while said second counting means of said each access unit for said second transmission channel has a content greater than that of said additional counting means of said each access unit for said second transmission channel, said each access unit responds by setting and transmitting a request bit in said time slot of said second transmission channel, decrementing the content of said second counting means for said second transmission channel by one more than the content of said additional counting means for said second transmission channel and resetting to zero the content of said additional counting means for said second transmission channel, whereby the foregoing three alternate responses of each said access unit signify that, prior to the above-defined responses, a previous step of determining the relative magnitudes, in terms of at least sense or equality, of the contents of said additional and second counting means of said each access unit for said second transmission channel must be previously performed to determine which of the three above-stated responses of said each access unit will be made following the arrival of said time slot.

* * * * *